UNITED STATES PATENT OFFICE.

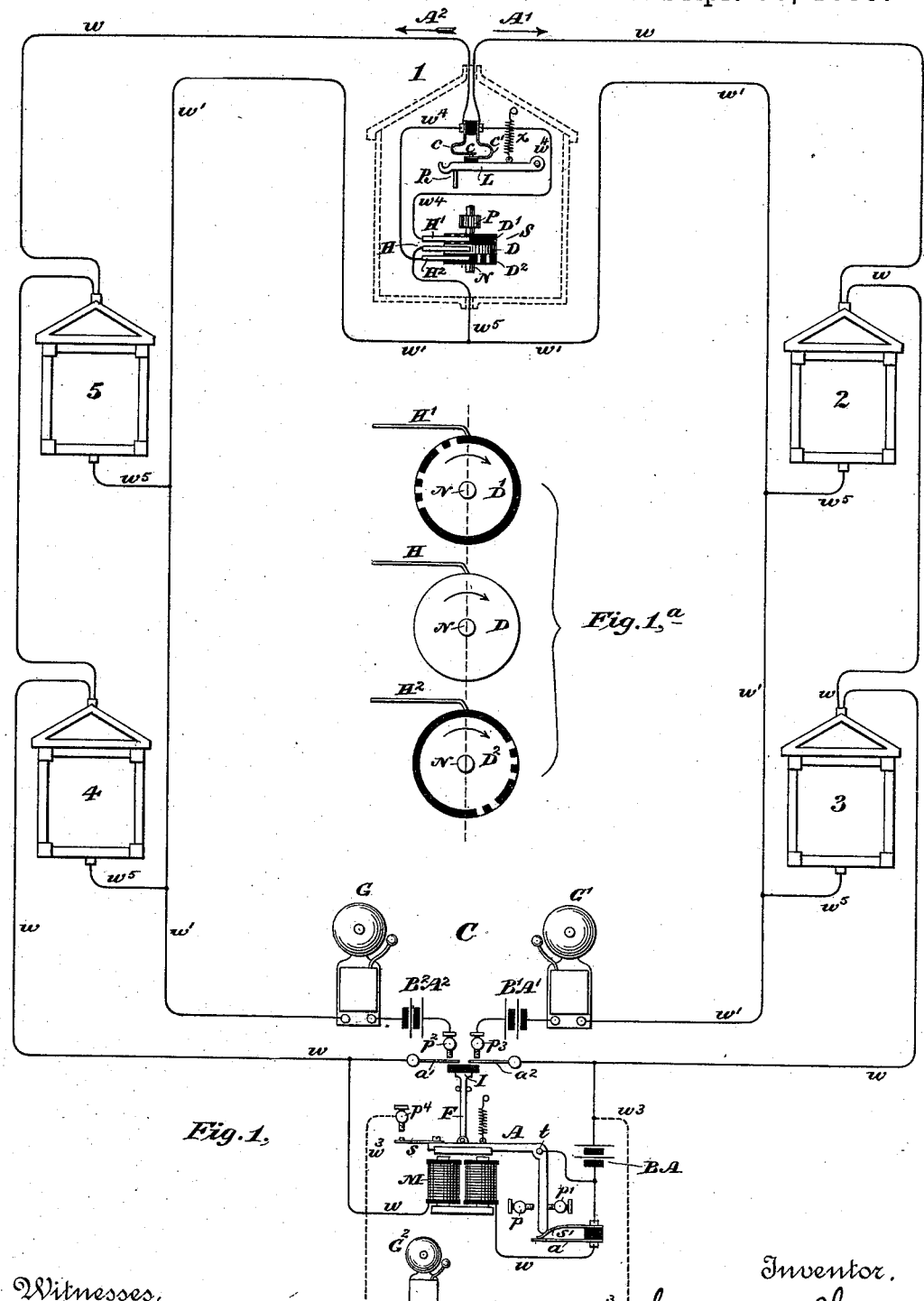

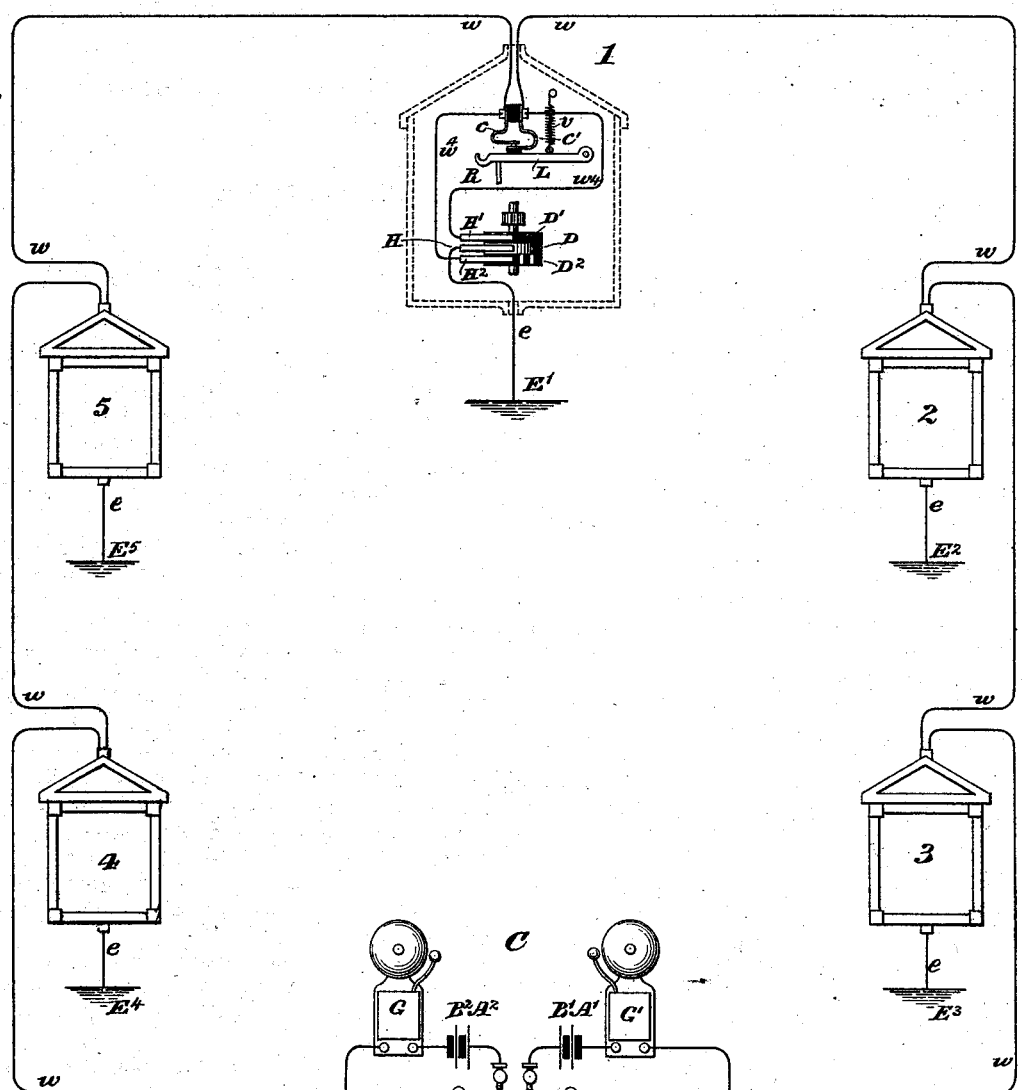

SIDNEY A. CHASE, OF EVART, MICHIGAN, ASSIGNOR OF ONE-HALF TO WILLIAM R. MAPES, OF SAME PLACE.

DUPLEX FIRE-ALARM TELEGRAPH.

SPECIFICATION forming part of Letters Patent No. 402,507, dated April 30, 1889.

Application filed April 9, 1888. Serial No. 270,114. (No model.)

*To all whom it may concern:*

Be it known that I, SIDNEY A. CHASE, a resident of the United States, residing at Evart, in the county of Osceola, in the State of Michigan, have invented a new and useful Improvement in Duplex Fire-Alarm Telegraphs, of which the following is a specification.

My invention relates to improvements in fire-alarm telegraphs of that class known as "non-interfering systems," and has for its object, first, to provide a duplex system in which the signals are sent from any outlying box or station to the central station by two different routes, and in such manner that at least two complete sets of signals are sent into said station for each complete revolution of the signaling-wheel; second, to arrange the circuits in connection with said signaling apparatus in such manner as to render the system non-interfering. I accomplish these objects by the mechanism hereinafter described, but particularly pointed out in the claims which follow this specification.

It was old prior to my invention to transmit signals from a series of outlying signal-boxes to a central station by either of two different routes. It was also old to cause the same signal to be transmitted first over one route and then over another through the agency of mechanism which permitted the signal-transmitting wheel or disk to transmit its signal or series of signals over the first route during one entire revolution and then to transmit said signal or signals over the other route during a second complete revolution; but I am not aware that it was old to so arrange such a system as to perform the functions attributed to any such apparatus as I have referred to in the statements of the objects of my invention, whereby the apparatus constituted both a duplex and a non-interfering fire-alarm system conjointly; nor am I aware that it was old to send two such sets of independent signals by different routes for each single revolution of the signal disk or wheel.

My invention will be better understood by referring to the accompanying drawings, in which—

Figure 1 represents a diagrammatic view of the invention as applied to an all-metallic or two-wire system. Fig. 1ª is a view of one of the signal-transmitting disks or wheels, showing the parts detached. Fig. 2 is a diagrammatic view of a modified form, showing a single-wire circuit with an individual earth-wire at each box.

C is the central station.

G G' are the gongs for receiving the signals over the outlying circuits and adapted to be actuated by two batteries, B' A' B² A², located in the signaling-wire $w'$.

M is an electro-magnet in the circuit $w$, running from the central station to and through the outlying boxes, 1 2 3 4 5, the circuit being closed in said wire $w$ at each box through contact-springs $c\ c'$, held together by the signaling-lever L, acting under the stress of the spring $x$. This circuit is also closed at the central station through the agency of the bell-crank lever A, pivoted at $t$, said lever acting upon the spring $s'$, when drawn down, so as to bring it in contact with a flat metallic contact-plate, $a$.

B A is the main-line battery for controlling the operation of the signal-transmitters on the gongs G G' through the agency of the batteries B² A² and B' A'.

G² is a gong located in a normally-open local circuit, $w^3$.

F is an arm pivotally attached to the armature-lever A, carrying a block, I, at its upper end adapted to lift the springs $a'\ a^2$ into contact with the adjustable contact-screws $p^2\ p^3$. The interior mechanism of the signaling-boxes is the same as that shown in box 1 and in detail in Fig. 1ª. The hook-lever L, of any well-known form, is connected in the well-known manner through a rack, R, or other analogous devices, and the usual train of gearing, with the pinion P on shaft N, which carries the signal-wheel S. This signal-wheel is made up in this instance of three disks, the central disk, D, being, as shown, entirely of metal and electrically connected with the shaft N, while the outer disks, D' and D², are similarly connected to the said shaft, but are insulated in a well-known manner on their surfaces in such way as to represent the signal to be transmitted, the upper disk, D', as shown in box 1, being adapted to transmit the signal or character 23 during the first half of its revolution, while the lower disk, $D^2$, is similarly arranged to transmit the same signal or character during the second half of the revolution of said signal-wheel.

H is a contact-spring bearing on the disk D. $H'$ $H^2$ are similar contact-springs bearing on disks $D'$ $D^2$, respectively.

The operation of this apparatus is as follows: The armature-lever A at the central station, having been pulled down so as to bring its bell-crank against the back contact-point $p'$, forces the spring $s'$ against the contact-plate $a$. This closes the circuit of the central-station battery B A through the wire $w$ and all of the outlying boxes, 3 2 1 5 4, by way of magnet M, the levers L in all the boxes being in their upper position under the stress of springs $x$, thereby closing the contacts $c$ $c'$. This energizes the magnet M and causes it to hold the armature-lever in the condition indicated. In this condition the batteries $B'$ $A'$ and $B^2$ $A^2$ are normally on open circuit, the circuit being broken between the points $p^2$ $p^3$ and springs $a'$ $a^2$, and the signaling wheels or disks in the various boxes being in the position indicated in box 1, the contact-springs $H'$ $H^2$ being on the insulated portions of said disks. When it is desired to transmit an alarm, the lever L is pulled down in the usual manner, and the spring or other mechanism which is designed to rotate the signal-wheel S is wound or put in condition to operate through the agency of the rack R or any well-known means, such devices being well understood by those skilled in the art. The downward motion of the lever L permits the springs $c$ $c'$ to separate, and thus break the circuit of the wire $w$. This causes the magnet M at the central station to release its armature-lever A, thereby breaking the main-line circuit $w$ at a point between the spring $s'$ and contact-plate $a$. When the armature A reaches its back-stop $p^4$, the spring $s$ carried at its outer end is brought into contact electrically with the point $p^4$, and the circuit of the battery B A is closed by wire $w^3$ to the large gong $G^2$, thereby giving warning that a signal is about to be transmitted. The same action of the armature causes the push-rod F to carry the insulated block I at its upper end against the contact-springs $a'$ $a^2$, and to force them into electrical contact with the adjustable contact-screws $p^2 p^3$. The lever L in the box R having been released by the person transmitting the signal, the signaling disk or wheel S commences to rotate in the direction of the arrow, as shown in Fig. 1ª. As the signaling-disk rotates, the contact-spring $H'$ comes successively into electrical contact with the metallic portion of the disk $D'$ five times during the first half of its revolution, the usual long break occurring between the characters 2 and 3, in a manner well understood. This signal 23 is sent into central station as follows: Starting from the contact-spring $H'$ in box 1, the current passes, as shown by arrow $A'$, by wire $w^4$ to wire $w$, through the boxes 2 and 3, wire $w$, contact-spring $a^3$, contact-point $p^3$, battery $B'$ $A'$, magnet of gong $G'$, wire $w'$ to wire $w^5$, contact-spring H, and disk D to starting-point. This causes the signal 23 to be sounded on gong $G'$ during the first half revolution of signal-wheel S. During the second half of its revolution the contact-spring $H^2$ sends in the same signal, and in the same manner, as shown by arrow $A^2$, through the left-hand gong G, by the action of battery $B^2$ $A^2$. It will thus be seen that this signal goes in twice during each complete revolution of the signal-wheel S, and is sounded on separate gongs. It will also be noted that the person located at the central station will have a preliminary warning by reason of the sounding of gong $G^2$. This gong also serves the additional function of a safeguard against accidental breakage of the line $w$, as it will be understood that any break in said line will cause the gong to ring.

I will now disclose how this apparatus serves the function of a non-interfering system.

Suppose the box 5 to have been pulled at identically the same time with box 1, it is obvious that both signals cannot be transmitted in the same direction, for the reason that the signal-wheel in box 1 will send its signal over the right-hand section of the wire $w$, and will break the circuit at the points $c$ and $H^2$, so that the other box cannot transmit through it. It results, therefore, that said box must utilize the other portion of the circuit, and in doing this it necessarily cuts off the second portion of the signal transmitted by the first box. In other words, one signal is sent in for each box in one direction only, the second signal in each box being cut out by the other. Similarly, should three boxes be pulled at the same time—as, for instance, 1, 2, and 5—boxes 2 and 5 would send their signals the one over the right-hand section and the other over the left-hand section of the system, while box 1 would be cut out and could not send its signal until both of the others had completed their entire signals over their respective sections. It will of course be understood that the mechanism in the signal-boxes should be so constructed as to cause several revolutions of the signaling-wheels.

The operation of the equivalent modified form shown in Fig. 2 will be understood after what has been said concerning the description of Fig. 1 and its operation, the only difference being that I provide an earth-wire, $e$, at each box connected directly to the central disk, D, while the signaling-batteries $B'$ $A'$ $B^2$ $A^2$ are similarly earthed through wires $w'$ at E, so that in the operation of the apparatus the signal is transmitted from battery $B'$ $A'$ through wire $w$ $w^4$, contact-spring $H'$, disk $D'$, disk D, wire $e$, earth $E'$, through the earth to the point E by wire $w'$ to gong $G'$, and in a similar manner the other portion of the signal is transmitted to the gong G.

Having thus described my invention, what I claim, and desire to secure by Letters Patent of the United States, is—

1. In a system of fire-alarm telegraphs or signals, the combination of a normally-closed main circuit, including circuit-breakers in each of a series of signaling-boxes and an electro-magnet at the central station, with an additional divided circuit, including two independent normally-open batteries, located also at the central station, and signal-transmitters at each box, divided into two parts, the central-station magnet having an armature-lever-carrying circuit, and controlling devices for keeping the main circuit normally closed, and also for closing the divided circuits when the main circuit is broken, whereby independent signals are transmitted by different routes, substantially as described.

2. In a system of fire-alarms or telegraphs, a main circuit including a series of circuit-breakers, one in each box, and an electro-magnet located at the central station, having an armature-lever carrying a circuit-controlling device adapted to hold the main circuit closed so long as the line is intact, with an additional circuit-controlling device on said armature-lever for closing a second or independent circuit when the main circuit is broken, and signal-transmitters, located one in each box, for sending signals over the two circuits conjointly, substantially as described.

3. In a non-interfering system of fire-alarms or telegraphs, the combination of a normally-closed main-line circuit, including circuit-breakers, one in each box, and an electro-magnet at the central station, with two signal-circuits, each normally open at one point in the central station, a three-part signal-transmitter in each box, one part of which is connected continuously with both of said open circuits, while the other parts are connected successively to different portions of the main-line wire, and a circuit-controlling armature-lever for said magnet, which in its normal position holds the main line closed, but when the main line is broken closes the normally-open circuits, substantially as described.

4. In a system of fire-alarm signals or telegraphs, a duplex signal-transmitter consisting of a central metallic disk and two independent signaling-disks having the same characteristic signal on each disk, but located at points diametrically opposite each other, in combination with contact-springs and circuit-connections, whereby the same signal may be sent twice in one revolution of the signal-wheel, substantially as described.

5. In a system of fire-alarm telegraphs or analogous signaling apparatus, the combination of a two-way signal composed of a continuity-preserving disk, and two independent transmitting-disks having the same characteristic signal arranged at different radial portions of their circumference, and a two-way signaling circuit running to the central station, including two independent gongs or signal-receiving apparatus, whereby the same signal is transmitted to the central station by different routes and sounded on independent alarm apparatus, substantially as described.

6. In a system of fire-alarm telegraphs or analogous signaling apparatus, the combination of a two-way signal-transmitter connected to two circuits running in opposite directions to a central station and through two normally-open batteries, and also connected to an additional circuit running to the central station, normally closed at circuit-breaking contacts in outlying signal-boxes and at the central station, where it includes an electro-magnet having a circuit-controlling armature adapted to control said circuit-breaking contacts at the central station, substantially as described.

7. In a fire-alarm or analogous system, the combination of the following elements: a normally-charged main line, a series of signal-transmitters located one at each of a series of outlying stations, a series of circuit-breakers similarly located, an electro-magnet located at the central station and included in said main-line circuit, a normally-closed circuit-closer held closed by the armature of said magnet so long as the main circuit remains intact, a preliminary signal-receiver located in a normally-open shunt from the main-line battery around said magnet, and one or more signaling-receivers located in one or more normally-open independent battery-circuits, substantially as described.

8. In a fire-alarm or analogous system of signals, the combination of the following elements: a two-way signal-transmitter located at a signaling-station connected to two circuits running by different routes to a central station, a circuit-breaker at said signaling-station, which normally shunts said signal-transmitter through both of said circuits, and an electro-magnet located in a central or receiving station and having an armature-lever which acts upon a circuit-closer, also located at said central station, and holds it closed so long as the main line remains intact, and two normally-open independent circuits open at back-stops of the armature while said magnet is energized, said circuits including independent signal-receivers and running by different routes to the double signal-transmitter located at the signal-station, substantially as described.

9. In a system of fire-alarm telegraphs or analogous signals, a duplex signal-transmitter composed of two independent signaling-disks having the same characteristic signal arranged on the surface of each disk, in combination with open-circuit contact-springs and circuit-connections, and a ground-circuit conducting part having a continually-closed earth-connection, and an automatic circuit-changer at the central station, and circuit-connections, whereby the same signal may be sent to the central station in opposite directions at every revolution of the circuit-wheel, substantially as described.

10. In a duplex system of fire-alarms or analogous signaling, the combination of a normally-closed main circuit, a series of circuit-breakers, one in each signal-box, and one in the central station, and a main-line battery and an electro-magnet circuit-changer at the central station, the circuit-changer controlling divided open-circuit signaling-circuits, including normally-open batteries and visual or audible signal-receiving apparatus, a duplex signal-transmitter in each signal-box, having a continuous electric connection with the divided circuits, and open-circuit electrical-signaling contact-springs connected to opposite portions of the normally-closed main-line wire running to the central station, a circuit-controlling armature-lever for said circuit-changer, which in its operation breaks the main-line circuit and closes the divided circuits, whereby two different signals may be sent at the same time in opposite directions, substantially as described.

SIDNEY A. CHASE.

Witnesses:
E. EVERETT ELLIS,
CURTIS LAMMOND.